(No Model.) 2 Sheets—Sheet 1.

J. H. PLAYER.
MACHINE FOR ASSEMBLING PARTS OF WHEELS.

No. 585,696. Patented July 6, 1897.

WITNESS

INVENTOR
John Henry Player
by Richardson
Att'ys.

(No Model.)

2 Sheets—Sheet 2.

J. H. PLAYER.
MACHINE FOR ASSEMBLING PARTS OF WHEELS.

No. 585,696.

Patented July 6, 1897.

WITNESS
H. Richard Wobe
Otto Munk

INVENTOR
John Henry Player
by Richard
Attys

UNITED STATES PATENT OFFICE.

JOHN HENRY PLAYER, OF COVENTRY, ENGLAND.

MACHINE FOR ASSEMBLING PARTS OF WHEELS.

SPECIFICATION forming part of Letters Patent No. 585,696, dated July 6, 1897.

Application filed November 24, 1896. Serial No. 613,322. (No model.) Patented in England February 11, 1896, No. 3,087.

*To all whom it may concern:*

Be it known that I, JOHN HENRY PLAYER, cycle manufacturer, a subject of the Queen of Great Britain, residing at 5 Wren Street, Coventry, in the county of Warwick, England, have invented a certain new and useful Improved Machine for Assembling the Parts of Wheels, of which the following is a specification.

The invention has been patented in England, No. 3,087, February 11, 1896.

The apparatus is primarily intended for assembling the parts of cycle, perambulator, and similar wheels, and it insures great truth in the completed wheel, as well as absence of unequal tension in the spokes, and is therefore a considerable improvement on the ordinary way of working.

In order that my invention may be clearly understood and more easily carried into practical effect, I have appended hereunto three sheets of drawings, upon which I have illustrated my improved wheel-builder.

Figure 1:
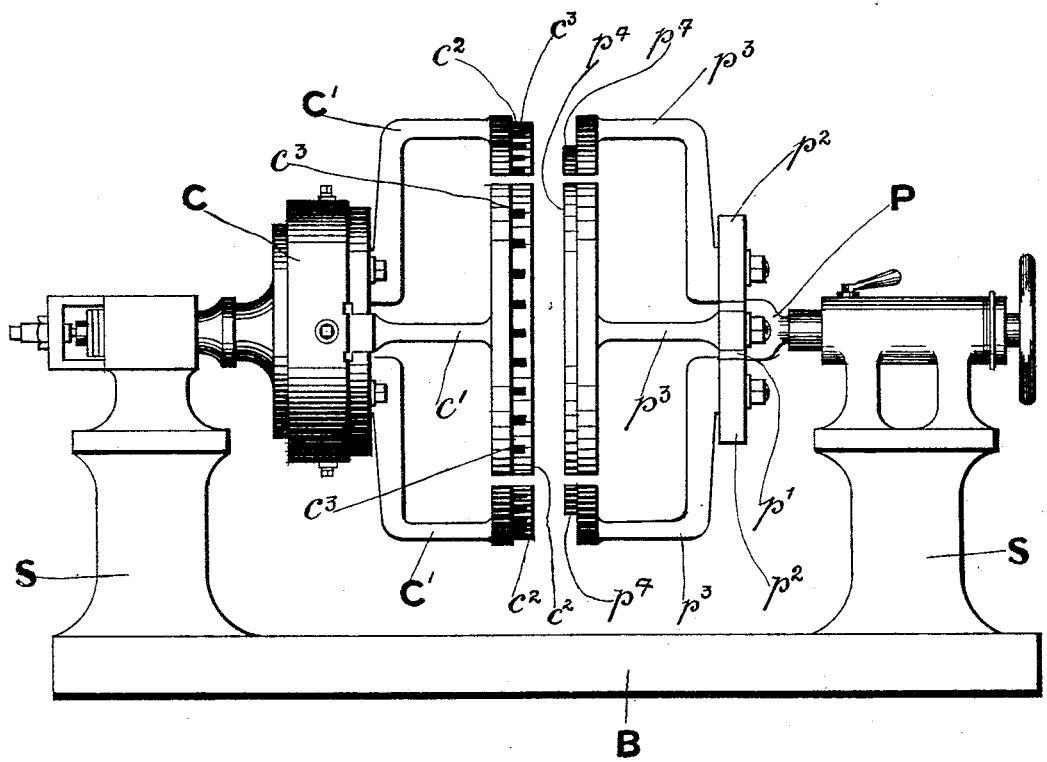
Figure 2:
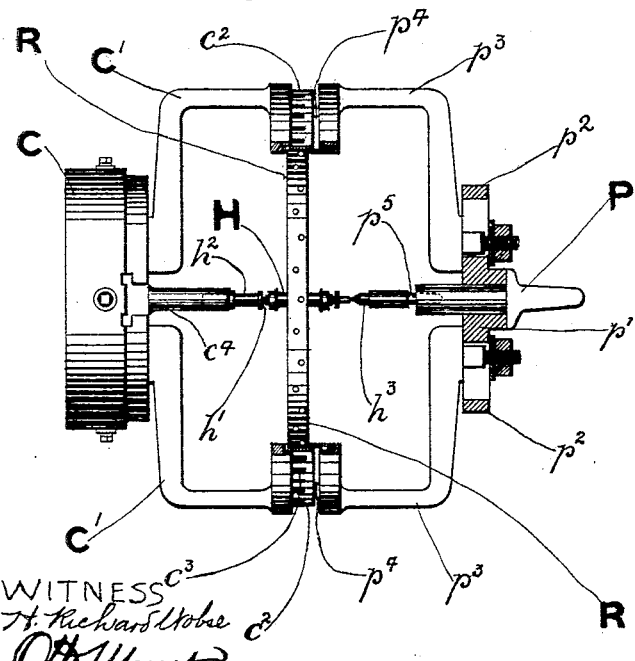
Figure 3:
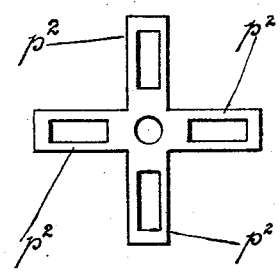
Figure 4:
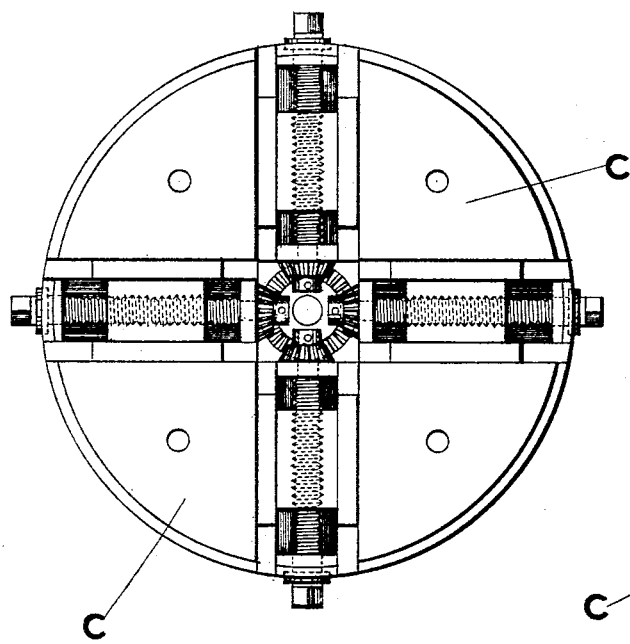
Figure 5:
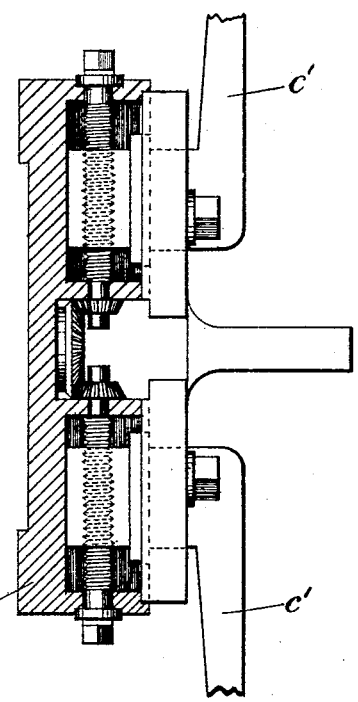
Figure 6:
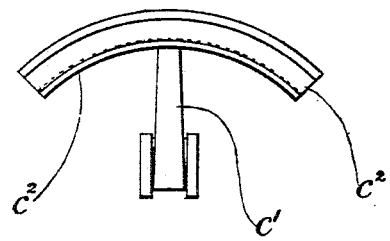
Figure 7:
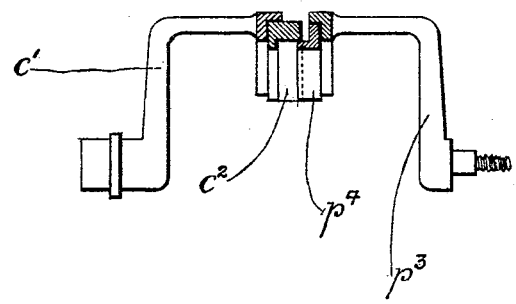

Figure 1 is a front elevation of my wheel-builder. Fig. 2 is a part sectional front elevation of the wheel-builder removed from its supports. Fig. 3 is a plan of the boss to which the arms are secured. Fig. 4 is an interior view of the universal chuck which carries the arms. Fig. 5 is a cross-sectional elevation of the chuck. Fig. 6 is a front view of one of the arms or jaws. Fig. 7 is a part sectional side elevation of the arms or jaws and the arcs.

In carrying my invention into practice I mount the universal chuck C and the puppet-head P in the standards S, which are attached to or form part of the bed B. This chuck C carries four arms or jaws $c'$, which can be opened or closed to suit the different-sized wheels, as clearly shown at Figs. 4 and 5. To the outer ends of each of the arms $c'$ is attached the quarter of a circular ring $c^2$ of Γ cross-section, and a number of holes $c^3$ are provided around the periphery of these rings. Attached to the puppet P also by means of the boss $p'$, which has four arms $p^2$, are four radiating arms $p^3$, similar to those on the chuck, their upper ends being inclined toward the ends of the arms on the chuck, and to the outer end of each of these four arms is attached the quarter of a circular ring $p^4$, of L-shaped cross-section, whose outer diameter is not more than the inner diameter of the ring $c^2$. Also attached to the center of the puppet is a smaller puppet $p^5$, immediately facing the center of the chuck C.

The machine is used as follows: The spindle $h'$ is fitted into the hub H by the usual balls and cones and held and centered between the small chuck $c^4$ and the small puppet $p^5$ by the adjustable pins $h^2$ and $h^3$. The spokes are then placed loosely in the rim R, and the hub and the jaws of the chuck C are then drawn toward the center of the chuck, carrying with them the segments $c^2$, thus closing them around the rim, which firmly holds it in position. The ring $p^4$, which bears against the edge of the rim, keeps it from moving latterally and so trues the side of the wheel. The spokes are then tightened up.

There may be more than four arms or jaws to the chuck and more than four segments attached to them, and the puppet may have more than four arms and segments, or instead of the segments on the puppet-arms I may use a complete ring or circle.

What I claim, then, is—

1. A machine for assembling the parts of wheels consisting essentially of the adjustable arms or jaws $c'$ with their segments $c^2$ in combination with the adjustable arms or jaws $p^3$ with their segments $p^4$ operated in the manner and for the purpose substantially as hereinbefore described and shown.

2. An assembling-machine for wheels comprising the chuck C, the puppet P, the adjustable arms carried thereby having bearings to engage the rims and bearings to engage the hubs, substantially as described.

In testimony that I claim the foregoing as my own I have affixed my name in the presence of two witnesses.

JOHN HENRY PLAYER.

Witnesses:
　THOMAS MARSTON,
　GEORGE LESTER.